United States Patent

Galla et al.

(10) Patent No.: US 10,446,345 B2
(45) Date of Patent: Oct. 15, 2019

(54) REFLOWABLE THERMAL FUSE

(71) Applicant: Littelfuse, Inc., Chicago, IL (US)

(72) Inventors: Matthew P. Galla, Los Altos, CA (US); Jianhua Chen, Sunnyvale, CA (US)

(73) Assignee: LITTELFUSE, INC., Chicago, IL (US)

( * ) Notice: Subject to any disclaimer, the term of this patent is extended or adjusted under 35 U.S.C. 154(b) by 95 days.

(21) Appl. No.: 15/865,698

(22) Filed: Jan. 9, 2018

(65) Prior Publication Data

US 2019/0214208 A1 Jul. 11, 2019

(51) Int. Cl.
*H01H 37/76* (2006.01)
*H02H 3/08* (2006.01)
*H01H 85/175* (2006.01)
*H01H 37/04* (2006.01)
*H01H 85/041* (2006.01)
*H01H 85/00* (2006.01)
*H01H 85/055* (2006.01)

(52) U.S. Cl.
CPC ...... *H01H 37/761* (2013.01); *H01H 85/1755* (2013.01); *H02H 3/085* (2013.01); *H01H 85/0047* (2013.01); *H01H 85/055* (2013.01); *H01H 2037/046* (2013.01); *H01H 2085/0414* (2013.01)

(58) Field of Classification Search
CPC .......... H01H 37/761; H01H 2037/046; H01H 2037/762; H01H 2037/768; H01H 85/0047; H01H 85/055; H01H 85/06; H01H 85/08; H01H 85/1755; H01H 85/36; H01H 2085/0414; H02H 3/085; H02H 5/047

USPC ........................................................ 337/298
See application file for complete search history.

(56) References Cited

U.S. PATENT DOCUMENTS

| 5,602,520 A | | 2/1997 | Baiatu et al. | |
| 5,712,610 A | * | 1/1998 | Takeichi | H01H 85/046 29/623 |
| 6,023,403 A | * | 2/2000 | McGuire | H01C 1/1406 338/22 R |
| 2001/0020888 A1 | * | 9/2001 | Schon | H01H 85/46 337/142 |

(Continued)

FOREIGN PATENT DOCUMENTS

EP 1422771 A1 5/2004
EP 1786011 A1 5/2007
(Continued)

OTHER PUBLICATIONS

European Search Report for the European Patent Application No. 19150063, dated Jun. 28, 2019, 7 pages.

*Primary Examiner* — Jacob R Crum

(57) ABSTRACT

A reflowable thermal fuse including a fuse body, a conductive composite element disposed within the fuse body, first and second conductive terminals connected to the conductive composite element and extending out of the fuse body, a removable barrier covering a surface of the conductive composite element and in electrical communication with the first and second conductive terminals, and a solvent element disposed on the removable barrier and separated from the conductive composite element by the removable barrier, wherein the removable barrier has a fusing temperature that is greater than a reflow temperature of the reflowable thermal fuse.

20 Claims, 3 Drawing Sheets

(56) References Cited

U.S. PATENT DOCUMENTS

| | | | |
|---|---|---|---|
| 2001/0055187 A1* | 12/2001 | McLoughlin | H01C 7/126 361/127 |
| 2008/0129440 A1* | 6/2008 | Ho | H01C 1/08 337/5 |
| 2009/0179729 A1* | 7/2009 | Yoshikawa | H01H 37/767 337/401 |
| 2012/0194315 A1* | 8/2012 | Matthiesen | H01H 37/761 337/142 |
| 2013/0033355 A1* | 2/2013 | Meyer | H01H 37/761 337/147 |
| 2015/0130585 A1* | 5/2015 | Nakajima | H01H 37/761 337/413 |

FOREIGN PATENT DOCUMENTS

| | | | |
|---|---|---|---|
| WO | 2014109364 A1 | 7/2014 | |
| WO | 2015028676 A1 | 3/2015 | |

\* cited by examiner

REFLOWABLE THERMAL FUSE

FIELD OF THE DISCLOSURE

The present disclosure relates generally to the field of circuit protection devices, and relates more particularly to thermal fuses.

FIELD OF THE DISCLOSURE

Fuses, which are commonly employed as circuit protection devices, are typically installed between a source of electrical power and a component in an electrical circuit that is to be protected. One type of fuse, commonly referred to as a "thermal fuse," includes an electrically insulating fuse body containing a fusible element that extends between electrically conductive, metallic terminals that extend through opposing longitudinal ends of the fuse body. Upon the occurrence of a specified fault condition, such as an overtemperature condition that may be caused by excessive current flowing through the fuse, the fusible element "trips" (i.e., melts) to interrupt the flow of electrical current between an electrical power source and a protected component.

In some applications, it may be desirable to implement a thermal fuse having a relatively low trip temperature. This may preclude the use of reflow soldering for installing the fuse within a circuit, since heat generated by the reflow soldering process may heat the fusible element of the thermal fuse above its melting temperature, causing the thermal fuse to trip prematurely.

It would be useful to provide a thermal fuse that can be installed in a circuit using a conventional reflow soldering process without prematurely tripping the thermal fuse, wherein the trip temperature of the thermal fuse is lower than a temperature to which the thermal fuse is subjected during installation. It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A reflowable thermal fuse in accordance with an exemplary embodiment of the present disclosure may include a fuse body, a conductive composite element disposed within the fuse body, first and second conductive terminals connected to the conductive composite element and extending out of the fuse body, a removable barrier covering a surface of the conductive composite element and in electrical communication with the first and second conductive terminals, and a solvent element disposed on the removable barrier and separated from the conductive composite element by the removable barrier, wherein the removable barrier has a fusing temperature that is greater than a reflow temperature of the reflowable thermal fuse.

A reflowable thermal fuse in accordance with another exemplary embodiment of the present disclosure may include a fuse body, a conductive composite element disposed within the fuse body, first and second conductive terminals connected to the conductive composite element and extending out of the fuse body, a substrate covering a surface of the conductive composite element and having an opening formed therein, a removable barrier disposed on the substrate and having a fusible area bridging the opening, the removable barrier disposed in electrical communication with the first and second conductive terminals, a solvent element disposed on the removable barrier and separated from the conductive composite element by the removable barrier, and a biasing element biasing the substrate and the removable barrier against the solvent element, wherein the removable barrier has a fusing temperature that is greater than a reflow temperature of the reflowable thermal fuse, and wherein the removable barrier is adapted to be fused at the fusible area when subjected to a predetermined activation current.

DETAILED DESCRIPTION

Figure 1A:
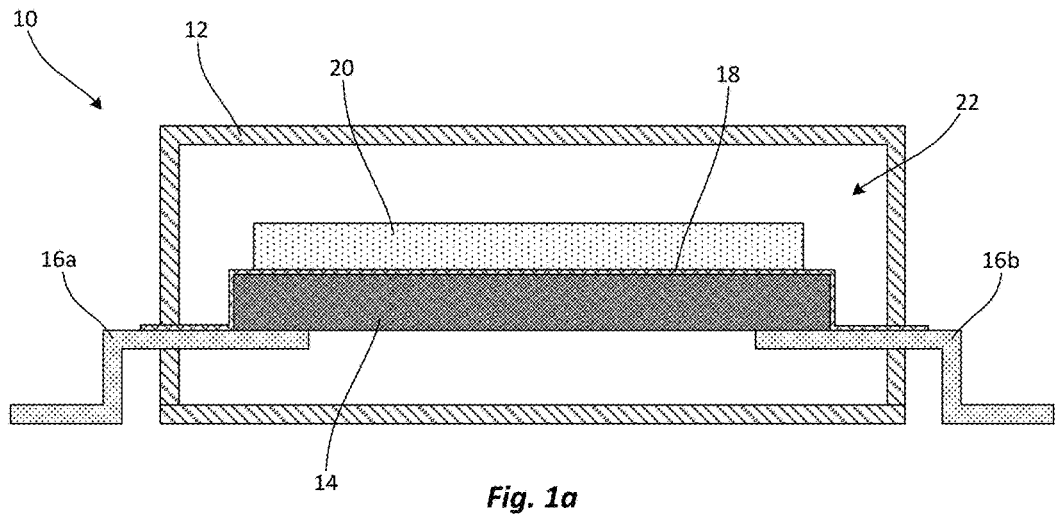
FIG. 1a is a cross-sectional side view illustrating a reflowable thermal fuse in accordance with an exemplary embodiment of the present disclosure.

Embodiments of a reflowable thermal fuse in accordance with the present disclosure will now be described more fully with reference to the accompanying drawings, in which preferred embodiments of the present disclosure are presented. The reflowable thermal fuse may, however, be embodied in many different forms and should not be construed as being limited to the embodiments set forth herein. Rather, these embodiments are provided so that this disclosure will convey certain exemplary aspects of the reflowable thermal fuse to those skilled in the art. In the drawings, like numbers refer to like elements throughout unless otherwise noted.

Referring to FIG. 1a, a cross-sectional side view of a reflowable thermal fuse 10 (hereinafter "the fuse 10") in accordance with an exemplary embodiment of the present disclosure is shown. The fuse 10 is shown as being a surface mount fuse, but this is not critical. It will be appreciated by those of ordinary skill in the art that various novel features of the fuse 10 that will be described below may be implemented in other types of fuses, including, but not limited to, cartridge fuses, blade fuses, etc. For the sake of convenience and clarity, terms such as "top," "bottom," "longitudinal," "lateral," "vertical," and "horizontal" may be used herein to describe the relative positions and orientations of various components of the fuse 10, all with respect to the geometry and orientation of the fuse 10 as it appears in FIG. 1a. Said terminology will include the words specifically mentioned, derivatives thereof, and words of similar import. Similar terminology will be used in a similar manner to describe subsequent embodiments disclosed herein.

The fuse 10 may include a fuse body 12, a conductive composite element 14, terminals 16a, 16b, a removable barrier 18, and a solvent element 20. The fuse body 12 may be formed of an electrically insulating material (e.g., plastic, ceramic, etc.) and may define an internal cavity 22. The conductive composite element 14 may be disposed within the internal cavity 22. The terminals 16a, 16b, which are formed of an electrically conductive material (e.g., copper or one of its alloys, plated with nickel or other conductive, corrosion resistant materials), may be connected to opposing ends of the conductive composite element 14, such as with solder, conductive epoxy, or the like, and may extend through the fuse body 12 for facilitating electrical connections to other circuit elements.

The conductive composite element 14 may be an elongate, substantially planar member as shown in FIG. 1a, but this is not critical. The size and shape of the conductive composite element 14 may be varied without departing from the scope of the present disclosure. The conductive composite element 14 may be formed of a positive temperature coefficient (PTC) material that includes conductive particles suspended in a polymer matrix. During normal, non-fault operation of the fuse 10, the conductive particles within the conductive composite element 14 may be relatively close together, and may thus provide a relatively low-resistance, electrically conductive pathway across the conductive composite element 14 and between the terminals 16a, 16b. However, when the conductive composite element 14 comes into contact with the solvent element 20 (as described in greater detail below), the conductive composite element 14 may rapidly absorb the solvent element 20, causing the polymer matrix to swell and further separate the conductive particles from one another. The resistance of the conductive composite element 14 is thereby significantly increased, which mitigates or substantially arrests current flowing between the terminals 16a, 16b.

The removable barrier 18 may be a layer or film of electrically conductive material that extends over, and that is disposed in intimate contact with, top and side surfaces of the conductive composite element 14 and top surfaces of the terminals 16a, 16b, thus providing an electrically conductive pathway between the terminals 16a, 16b. The opposing ends of the removable barrier 18 are shown in FIG. 1a as extending out of the fuse body 12, but this is not critical. Alternative embodiments of the fuse 10 are contemplated in which the removable barrier 18 is be disposed entirely within the fuse body 12.

The removable barrier 18 may, through appropriate selection of its size, shape, and material composition, be adapted to be fused (e.g., separated) when subjected to a predetermined, relatively low current, but to remain intact when subjected to relatively high heat (e.g., a high temperature that the removable barrier 18 is exposed to when the fuse 10 is installed in a circuit via reflow soldering, hereinafter referred to as a "reflow temperature"). For example, the removable barrier 18 may be adapted to fuse at a current of about 2 Amps, but to remain intact at when exposed to reflow temperatures exceeding 260 degrees Celsius. The minimum temperature at which the removable barrier 18 fuses or separates may be referred to as the "fusing temperature" of the removable barrier 18. In a non-limiting example, the removable barrier 18 may be a laminar element formed of a layer of copper disposed atop a layer of polyimide. The removable barrier 18 is not limited in this regard, and it is contemplated that the removable barrier 18 may additionally or alternatively include various other materials, including, but not limited to, tin, nickel, etc.

The solvent element 20 may be an elongate, substantially planar member as shown in FIG. 1a, but this is not critical.

The size and shape of the solvent element 20 may be varied without departing from the scope of the present disclosure. The solvent element 20 may be disposed within the internal cavity 22 of the fuse body 12 atop the removable barrier 18. More particularly, the removable barrier 18 may entirely separate, and may provide a continuous barrier between, the solvent element 20 and the conductive composite element 14.

The solvent element 20 may be formed of a precision melting organic compound (PMOC) that melts rapidly above a predetermined temperature. In one example, the melting temperature of the PMOC may be in a range of 120 degrees Celsius to 125 degrees Celsius (e.g., 122 degrees Celsius). The present disclosure is not limited in this regard. The PMOC may have a high affinity for, and a high mobility within, the material of the conductive composite element 14. Thus, when the solvent element 20 is in a liquid or semi-liquid state and is brought into contact with the conductive composite element 14, the conductive composite element 14 may readily absorb the solvent element 20 and the solvent element 20 may be distributed substantially evenly throughout the conductive composite element 14 in a relatively short period of time. In a non-limiting, exemplary embodiment, the PMOC may be bisphenol A (BPA) with a melting temperature below a reflow temperature of the fuse 10. Alternative PMOCs that may be used include, but are not limited to, bisphenol A, triphenylene, tetrabromobisphenol A, bisphenol S, Bisphenol P, 4,4'-Sulfonyldiphenol, 4-Hydroxybenzaldehyde, 4-Nitroaniline, 4-Aminobenzoic acid, 4-Nitrophenol, Resorcinol, Benzoin, and Aspartic acid.

During installation of the fuse 10 in a circuit, the terminals 16a, 16b may be reflow soldered to a printed circuit board (PCB) in electrical connection with other circuit elements (e.g., an electrical power source and a load), whereby the fuse 10 may be subjected to a reflow temperature in excess of 260 degrees Celsius, for example. The reflow temperature may be well above the melting temperature of the solvent element 20, and the solvent element 20 may therefore be melted into a liquid or semi-liquid state. However, the removable barrier 18 may have a melting temperature that is above the reflow temperature, and may therefore remain intact. The removable barrier 18 therefore maintains physical separation between the solvent element 20 and the conductive composite element 14 during installation of the fuse 10, thus preventing the fuse 10 from being prematurely tripped.

After solder reflow installation of the fuse 10 is completed and the solvent element 20 is allowed to cool, the solvent element 20 may return to a "normal" temperature (e.g., room temperature) and may re-solidify. The fuse 10 may subsequently operate in a normal manner, wherein the conductive composite element 14 has a relatively low resistance, and the conductive composite element 14 and the removable barrier 18 carry current in parallel between the terminals 16a, 16b.

Figure 1B:
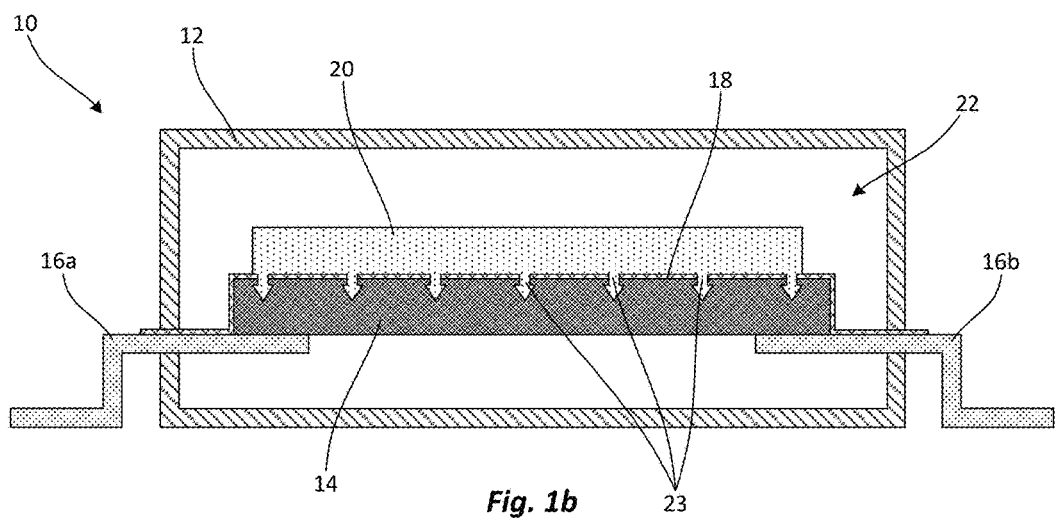
FIG. 1b is a cross-sectional side view illustrating the reflowable thermal fuse of FIG. 1a in a tripped state.

Upon the occurrence of a fault condition (e.g., an overcurrent condition) in the fuse 10, the current flowing through the removable barrier 18 may exceed a predetermined "trip level" (e.g., 2 Amps), whereupon the removable barrier 18 may fuse (i.e., melt, separate, etc.). Heat radiated by the conductive composite element 14 and the removable barrier 18 during the fault condition may be sufficient to cause the solvent element 20 to rapidly melt. Thus, referring to FIG. 1B, the melted solvent element 20 may flow through one or more separations 23 in the removable barrier 18 and may contact, and be absorbed by, the conductive composite element 14. The solvent element 20 is shown in FIG. 1B as flowing through a plurality of discrete separations 23 in the removable barrier 18, but this is not critical. It is contemplated that the removable barrier 18 may alternatively be configured to separate at a single location when the trip level is exceeded.

As described above, the conductive composite element 14 may absorb the melted solvent element 20, causing the polymer matrix of the conductive composite element 14 to rapidly swell and separate the conductive particles within the polymer matrix from one another. The resistance of the conductive composite element 14 is thereby significantly increased, substantially arresting current flowing between the terminals 16a, 16b. Electrical components that are connected to the fuse 10 may thereby be protected during overcurrent events.

Figure 2A:
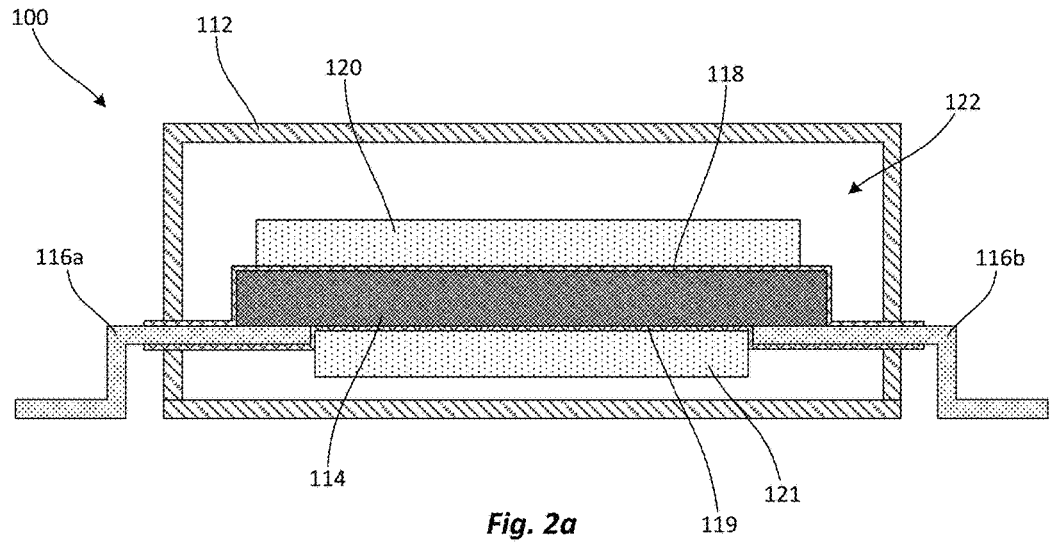
FIG. 2a is a cross-sectional side view illustrating a reflowable thermal fuse in accordance with another exemplary embodiment of the present disclosure.

Referring to FIG. 2, a cross-sectional side view of a reflowable thermal fuse 100 (hereinafter "the fuse 100") in accordance with another exemplary embodiment of the present disclosure is shown. The fuse 100 may be substantially similar to the fuse 10 described above, and may include a fuse body 112, a conductive composite element 114, terminals 116a, 116b, a first removable barrier 118, and a first solvent element 120 that may be substantially similar to the fuse body 12, the conductive composite element 14, the terminals 16a, 16b, the removable barrier 18, and the solvent element 20, respectively. Additionally, the fuse 100 may include a second removable barrier 119 and a second solvent element 121.

The second removable barrier 119 may be substantially similar to the first removable barrier but may extend under, and may be disposed in intimate contact with, the bottom surface of the conductive composite element 14 and bottom surfaces of the terminals 116a, 116b, thus providing an electrically conductive pathway between the terminals 116a, 116b. The opposing ends of the second removable barrier 119 are shown in FIG. 2 as extending out of the fuse body 112, but this is not critical. Alternative embodiments of the fuse 100 are contemplated in which the second removable barrier 119 is be disposed entirely within the fuse body 112.

The second solvent element 121 may be substantially similar to the first solvent element but may be disposed on an underside of the second removable barrier 119. More particularly, the second removable barrier 119 may entirely separate, and may provide a continuous barrier between, the second solvent element 121 and the conductive composite element 14.

Figure 2B:
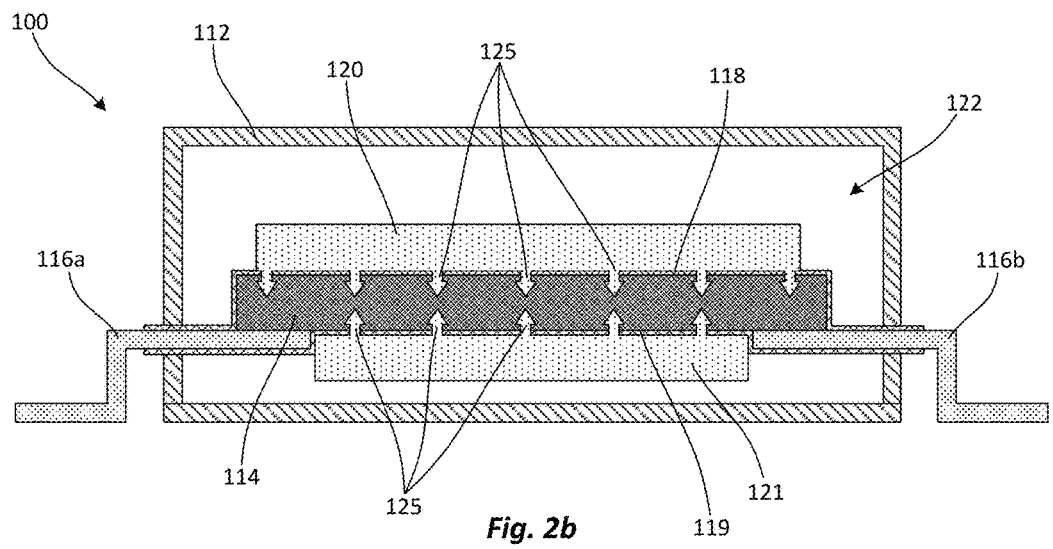
FIG. 2b is a cross-sectional side view illustrating the reflowable thermal fuse of FIG. 2a in a tripped state.

Upon the occurrence of a fault condition (e.g., an overcurrent condition) in the fuse 100, the current flowing through the first and second removable barriers 118, 119 may exceed a predetermined "trip level" (e.g., 2 Amps), whereupon the first and second removable barriers 118, 119 may fuse (i.e., melt, separate, etc.). Heat radiated by the conductive composite element 14 and the first and second removable barriers 118, 119 during the fault condition may be sufficient to cause the first and second solvent elements 120, 121 to rapidly melt. Thus, referring to FIG. 2B, the melted first and second solvent elements 120, 121 may flow through one or more separations 123, 125 in the first and second removable barriers 118, 119, respectively, and may contact, and be absorbed by, the conductive composite element 14. The first and second solvent elements 120, 121 are shown in FIG. 2B as flowing through a plurality of discrete separations 123, 125 in the first and second removable barriers 118, 119, respectively, but this is not critical. It is contemplated that one or both of the first and second removable barriers 118, 119 may alternatively be configured to separate at a single location when the trip level is exceeded.

As described above, the conductive composite element 114 may absorb the melted first and second solvent elements 120, 121, causing the polymer matrix of the conductive composite element 114 to rapidly swell and separate the conductive particles within the polymer matrix from one another. The resistance of the conductive composite element 114 is thereby significantly increased, substantially arresting current flowing between the terminals 116a, 116b. Electrical components that are connected to the fuse 10 may thereby be protected during overcurrent events. Since the conductive composite element 114 of the fuse 100 absorbs solvent through both its top surface and its bottom surface simultaneously, a greater amount of solvent may be absorbed into the conductive composite element 114 over a given period of time relative to the conductive composite element 14 of the fuse 10. Thus, upon occurrence of an overcurrent condition, the conductive composite element 114 may be swelled more quickly, and may thus arrest current flow more quickly, than the conductive composite element 14 of the fuse 10 described above.

Figure 3A:
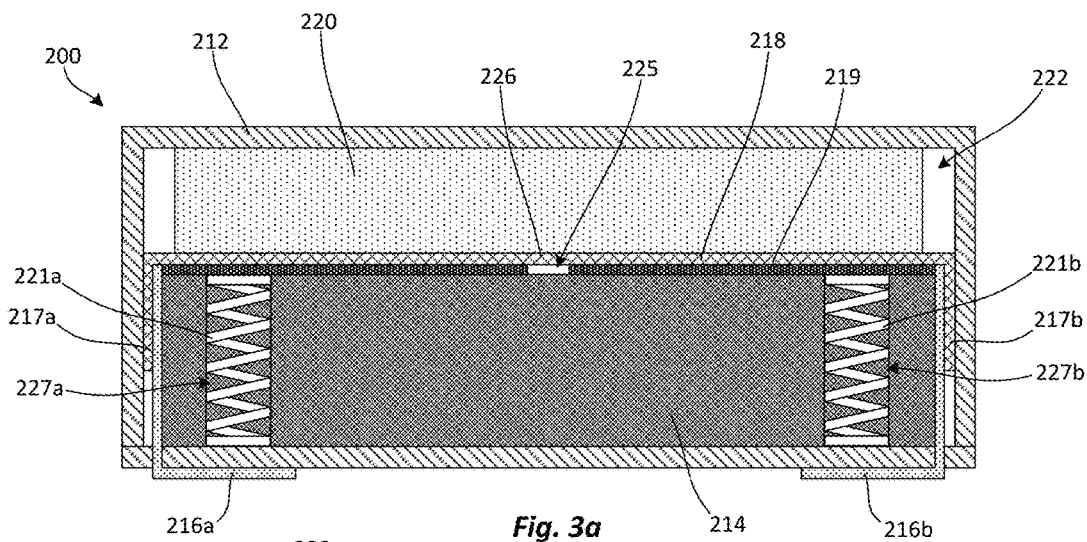
FIG. 3a is a cross-sectional side view illustrating a reflowable thermal fuse in accordance with another exemplary embodiment of the present disclosure.

Referring to FIG. 3a, a cross-sectional side view of a reflowable thermal fuse 200 (hereinafter "the fuse 200") in accordance with another exemplary embodiment of the present disclosure is shown. The fuse 200 may include a fuse body 212, a conductive composite element 214, terminals 216a, 216b, a removable barrier 218 formed on a substrate 219, a solvent element 220, and spring elements 221a, 221b. The fuse body 212 may be formed of an electrically insulating material (e.g., plastic, ceramic, etc.) and may define an internal cavity 222. The conductive composite element 214 may be disposed within the internal cavity 222 and seated on a floor of the fuse body 212. The terminals 216a, 216b, which are formed of an electrically conductive material (e.g., copper or one of its alloys, plated with nickel or other conductive, corrosion resistant materials), may include vertically-oriented portions 217a, 217b that may be connected to opposing ends of the conductive composite element 214, such as with solder, conductive epoxy, or the like. The terminals 216a, 216b may extend through the floor of the fuse body 212 and may be bent in a desired manner (e.g., flat against a bottom of the fuse body 212 as pictured) to facilitate electrical connections to other circuit elements.

The conductive composite element 214 may be an elongate, substantially planar member as shown in FIG. 3a, but this is not critical. The size and shape of the conductive composite element 214 may be varied without departing from the scope of the present disclosure. The conductive composite element 214 may be formed of a positive temperature coefficient (PTC) material that includes conductive particles suspended in a polymer matrix. During normal, non-fault operation of the fuse 210, the conductive particles within the conductive composite element 214 may be relatively close together, and may thus provide a relatively low-resistance, electrically conductive pathway across the conductive composite element 14 and between the terminals 216a, 216b. However, when the conductive composite element 14 comes into contact with the solvent element 220 (as described in greater detail below), the conductive composite element 214 may rapidly absorb the solvent element 220, causing the polymer matrix to swell and further separate the conductive particles from one another. The resistance of the conductive composite element 214 is thereby significantly increased, which mitigates or substantially arrests current flowing between the terminals 216a, 216b.

The removable barrier 218 may be a layer or film of electrically conductive material that is formed (e.g., printed, laminated, or otherwise deposited) on the electrically insulating substrate 219. The substrate 219, which may be formed of FR-4 or a similar material, may have one or more openings 225 formed therein. The removable barrier 218 may include one or more fusible areas 226 (described below) that bridge the openings 225. The ends of the removable barrier 218 may be disposed in contact with, and are moveable relative to, the terminals 216a, 216b. For example, the ends of the removable barrier 218 may be vertically oriented and may be disposed horizontally adjacent, an in horizontal abutment with, the vertically-oriented portions 217a, 217b of the terminals 216a, 216b as shown in FIG. 3a.

The removable barrier 218 may, through appropriate selection of its size, shape, and material composition, be adapted to be fused (e.g., separated) at the fusible areas 226 when subjected to a predetermined, relatively low "activation current," but to remain intact when subjected to relatively high heat (e.g., a high temperature that the removable barrier 218 is exposed to when the fuse 100 is installed in a circuit via reflow soldering, hereinafter referred to as a "reflow temperature"). For example, the removable barrier 218 may be adapted to fuse at a current of about 2 Amps, but to remain intact at when exposed to reflow temperatures exceeding 260 degrees Celsius. The minimum temperature at which the fusible area 226 of the removable barrier 218 fuses or separates may be referred to as the "fusing temperature" of the removable barrier 218. In a non-limiting example, the removable barrier 218 may be formed of copper. The removable barrier 218 is not limited in this regard, and it is contemplated that the removable barrier 18 may additionally or alternatively include various other materials, including, but not limited to, tin, nickel, etc.

The solvent element 220 may be an elongate, substantially planar member as shown in FIG. 3a, but this is not critical. The size and shape of the solvent element 220 may be varied without departing from the scope of the present disclosure. The solvent element 220 may be disposed within the internal cavity 222 of the fuse body 212 atop the removable barrier 218. More particularly, the removable barrier 218 may entirely separate, and may provide a continuous barrier between, the solvent element 220 and the conductive composite element 214.

The spring elements 221a, 221b may be disposed within corresponding through-holes 227a, 227b formed in the conductive composite element 214 and may be held in compression between the floor of the fuse body 212 and the substrate 219. The solvent element 20, which occupies the space above the removable barrier 218, may prevent unloading of the spring elements 221a, 221b and upward movement of the substrate 219 and the removable barrier 218. In a non-limiting embodiment of the fuse 200 the spring elements 221a, 221b may be coil springs. The present disclosure is not limited in this regard, and it is contemplated that the spring elements 221a, 221b may be any type of biasing member that biases the substrate 219 upwardly, away from the floor of the fuse body 212.

The solvent element 220 may be formed of a precision melting organic compound (PMOC) that melts rapidly above a predetermined temperature. In one example, the melting temperature of the PMOC may be in a range of 120 degrees Celsius to 125 degrees Celsius (e.g., 122 degrees Celsius). The present disclosure is not limited in this regard. The PMOC may have a high affinity for, and a high mobility within, the material of the conductive composite element 214. Thus, when the solvent element 220 is in a liquid or semi-liquid state and is brought into contact with the conductive composite element 214, the conductive composite element 214 may readily absorb the solvent element 220 and the solvent element 220 may be distributed substantially evenly throughout the conductive composite element 214 in a relatively short period of time. In a non-limiting, exemplary embodiment, the PMOC may be bisphenol A (BPA) with a melting temperature below a reflow temperature of the fuse 210. Alternative PMOCs that may be used include, but are not limited to bisphenol A, triphenylene, tetrabromobisphenol A, bisphenol S, Bisphenol P, 4,4'-Sulfonyldiphenol, 4-Hydroxybenzaldehyde, 4-Nitroaniline, 4-Aminobenzoic acid, 4-Nitrophenol, Resorcinol, Benzoin, and Aspartic acid.

During installation of the fuse 210 in a circuit, the terminals 216a, 216b may be reflow soldered to a printed circuit board (PCB) in electrical connection with other circuit elements (e.g., an electrical power source and a load), whereby the fuse 210 may be subjected to a reflow temperature in excess of 260 degrees Celsius, for example. The reflow temperature may be well above the melting temperature of the solvent element 220, and the solvent element 220 may therefore be melted into a liquid or semi-liquid state. However, the removable barrier 218 may have a melting temperature that is above the reflow temperature, and may therefore remain intact. The removable barrier 218 therefore maintains physical separation between the solvent element 220 and the conductive composite element 214 during installation of the fuse 210, thus preventing the fuse 210 from being prematurely tripped.

Figure 3B:
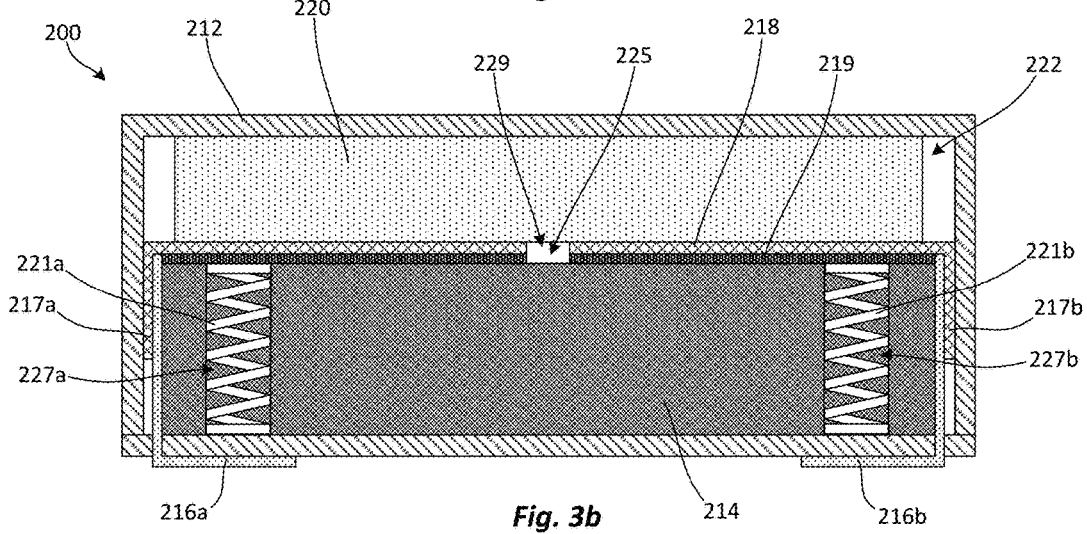
FIG. 3b is a cross-sectional side view illustrating the reflowable thermal fuse of FIG. 3a in an activated state.

After solder reflow installation of the fuse 210 is completed and the solvent element 220 is allowed to cool, the solvent element 220 may return to a "normal" temperature (e.g., room temperature) and may re-solidify. At this point, an activation current may be applied to the fuse 200. As described above, the activation current may be a current that is sufficient to fuse the fusible areas 226 of the of the removable barrier 218, leaving a gap 229 as shown in FIG. 3b. The activation current may be applied for a relatively short period of time, and the application of the activation current does not generate sufficient heat in the removable barrier 218 or in the conductive composite element 214 to melt the solvent element 220. The solvent element 220 therefore remains in a solid state and does not flow through the gap 229 in the fused removable barrier 218. Additionally, the solid solvent element 220 continues to occupy the space above the removable barrier 218 to prevent unloading of the spring elements 221a, 221b and upward movement of the substrate 219 and the removable barrier 218.

After the fuse 200 has been activated (i.e., after application of the activation current and fusing of the fusible areas 226), the fuse 200 may operate in a normal manner, wherein the conductive composite element 214 has a relatively low resistance and carries current between the terminals 216a, 216b.

Figure 3C:
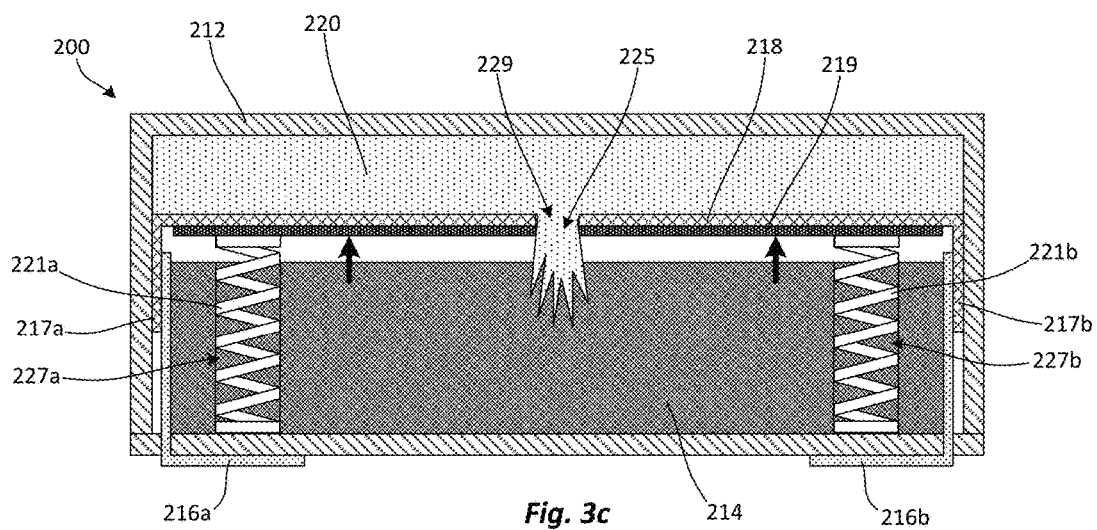
FIG. 3c is a cross-sectional side view illustrating the reflowable thermal fuse of FIG. 3a in a tripped state.

Upon the occurrence of a fault condition (e.g., an overcurrent condition) in the fuse 210, the current flowing through the conductive composite element 214 may exceed a predetermined "trip level" (e.g., 2 Amps), whereupon heat radiated by the conductive composite element 14 during the fault condition may be sufficient to cause the solvent element 220 to rapidly melt. Thus, referring to FIG. 3c, the melted solvent element 220 may flow through the gap 229 in the removable barrier 18 and may contact, and be absorbed by, the conductive composite element 14. Additionally, the spring elements 221a, 221b may force the substrate 219 and the removable barrier 218 upwardly against the liquified solvent element 220, thereby forcibly squeezing the solvent element 220 out through the gap 229 and the opening 225 and into contact with the conductive composite element 214 as shown in FIG. 3c.

As described above, the conductive composite element 214 may absorb the melted solvent element 220, causing the polymer matrix of the conductive composite element 214 to rapidly swell and separate the conductive particles within the polymer matrix from one another. The resistance of the conductive composite element 214 is thereby significantly increased, substantially arresting current flowing between the terminals 216a, 216b. Electrical components that are connected to the fuse 10 may thereby be protected during overcurrent events.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A reflowable thermal fuse comprising:
   a fuse body;
   a conductive composite element disposed within the fuse body;
   first and second conductive terminals connected to the conductive composite element and extending out of the fuse body;
   a removable barrier covering a surface of the conductive composite element and in electrical communication with the first and second conductive terminals; and
   a solvent element disposed on the removable barrier and separated from the conductive composite element by the removable barrier.

2. The reflowable thermal fuse of claim 1, wherein the removable barrier has a fusing temperature that is greater than a reflow temperature of the reflowable thermal fuse.

3. The reflowable thermal fuse of claim 1, wherein the solvent element is formed of a precision melting organic compound (PMOC).

4. The reflowable thermal fuse of claim 3, wherein the PMOC includes at least one of bisphenol A, triphenylene, tetrabromobisphenol A, bisphenol S, Bisphenol P, 4,4'-Sulfonyldiphenol, 4-Hydroxybenzaldehyde, 4-Nitroaniline, 4-Aminobenzoic acid, 4-Nitrophenol, Resorcinol, Benzoin, and Aspartic acid.

5. The reflowable thermal fuse of claim 1, wherein the conductive composite element is formed of a positive temperature coefficient (PTC) material including conductive particles suspended in a polymer matrix.

6. The reflowable thermal fuse of claim 1, wherein the conductive composite element is adapted to absorb the solvent element to cause a resistance of the conductive composite element to increase.

7. The reflowable thermal fuse of claim 1, wherein the solvent element is adapted to melt upon the occurrence of an overcurrent condition in the reflowable thermal fuse.

8. The reflowable thermal fuse of claim 1, wherein the removable barrier is adapted to fuse upon the occurrence of an overcurrent condition in the reflowable thermal fuse, whereby the solvent element is allowed to come into contact with the conductive composite element.

9. The reflowable thermal fuse of claim 1, wherein the removable barrier is a laminar element formed of a layer of copper disposed on a layer of polyimide.

10. The reflowable thermal fuse of claim 1, wherein the removable barrier is a first removable barrier covering a first surface of the conductive composite element and wherein the solvent element is a first solvent element, the reflowable thermal fuse further comprising:
    a second removable barrier covering a second surface of the conductive composite element opposite the first surface, the second solvent element disposed on the second removable barrier and separated from the conductive composite element by the second removable barrier.

11. A reflowable thermal fuse comprising:
    a fuse body;
    a conductive composite element disposed within the fuse body;
    first and second conductive terminals connected to the conductive composite element and extending out of the fuse body;
    a substrate covering a surface of the conductive composite element and having an opening formed therein;
    a removable barrier disposed on the substrate and having a fusible area bridging the opening, the removable barrier disposed in electrical communication with the first and second conductive terminals;
    a solvent element disposed on the removable barrier and separated from the conductive composite element by the removable barrier; and
    a biasing element biasing the substrate and the removable barrier against the solvent element;
    wherein the removable barrier is adapted to be fused at the fusible area when subjected to a predetermined activation current.

12. The reflowable thermal fuse of claim 11, wherein the removable barrier has a fusing temperature that is greater than a reflow temperature of the reflowable thermal fuse.

13. The reflowable thermal fuse of claim 11, wherein the solvent element is formed of a precision melting organic compound (PMOC).

14. The reflowable thermal fuse of claim 13, wherein the PMOC includes at least one of bisphenol A, triphenylene, tetrabromobisphenol A, bisphenol S, Bisphenol P, 4,4'-Sulfonyldiphenol, 4-Hydroxybenzaldehyde, 4-Nitroaniline, 4-Aminobenzoic acid, 4-Nitrophenol, Resorcinol, Benzoin, and Aspartic acid.

15. The reflowable thermal fuse of claim 11, wherein the conductive composite element is formed of a positive temperature coefficient (PTC) material including conductive particles suspended in a polymer matrix.

16. The reflowable thermal fuse of claim 11, wherein the conductive composite element is adapted to absorb the solvent element to cause a resistance of the conductive composite element to increase.

17. The reflowable thermal fuse of claim 11, wherein the solvent element is adapted to melt and to flow through the removable barrier and through the opening in the substrate upon the occurrence of an overcurrent condition in the reflowable thermal fuse.

18. The reflowable thermal fuse of claim 11, wherein the removable barrier is a laminar element formed of a layer of copper disposed on a layer of polyimide.

19. The reflowable thermal fuse of claim 11, wherein the opening in substrate comprises a plurality of opening in the substrate, and the fusible area of the removable barrier comprises a plurality of fusible areas bridging respective ones of the openings in the substrate.

20. The reflowable thermal fuse of claim 11, wherein the biasing element comprises a coil spring extending through the conductive composite element.

* * * * *